United States Patent Office 3,567,401
Patented Mar. 2, 1971

3,567,401
VERTICAL DENUDERS
Geoffrey Thomas Sheppard and Ronald Geoffrey Cottam, Runcorn, England, assignors to Imperial Chemical Industries Limited, London, England
Filed May 5, 1967, Ser. No. 636,531
Claims priority, application Great Britain, May 31, 1966, 24,224/66
Int. Cl. C01d 1/04
U.S. Cl. 23—283                                  12 Claims

ABSTRACT OF THE DISCLOSURE

A vertical alkali-metal amalgam denuder having a resilient holding-down plate to prevent attrition of the graphite packing. The holding-down plate is preferably in the form of a resilient bed of material (e.g. wire mesh) having a thickness of at least one inch.

---

This invention relates to an improved holding-down plate for retaining the packing in a vertical alkali metal amalgam denuder.

Vertical denuders in which alkali metal amalgam and water are contacted in the presence of pieces of graphite to produce an aqueous solution of the alkali metal hydroxide and hydrogen are well known and it has in the past been the custom to use a rigid holding-down plate to keep the pieces (lumps or spheres) of graphite in position, this plate being urged downwards on to the bed of graphite by means of springs. However, use of such denuders has not proved to be entirely satisfactory in that considerable attrition of the graphite can occur during operation of the denuder causing at one and the same time a rapid loss of graphite from the denuder (with the consequent loss of activity) and the production of an alkali metal hydroxide solution containing a high proportion of finely divided graphite. Furthermore it is not easy to provide springs cheaply which are resistant to the corrosive conditions existing in the denuder.

We have now found that the attrition of the graphite pieces and in consequence, the proportion of graphite in the alkali metal hydroxide solution can be considerably reduced by the use of a novel form of holding-down plate. We have also found that use of such holding-down plates can have the advantage of assisting in the distribution of mercury through the bed of graphite.

Thus according to our invention we provide a vertical denuder, suitable for decomposing alkali metal amalgam, particularly a sodium amalgam, with water, and comprising a bed of graphite pieces held in position by a holding-down plate, which plate is itself resilient. We prefer that this holding-down plate should have a high free space, for example greater than 90% voidage, thus not hindering the passage of liquids through it and a low pore size, i.e. it should only allow particles of small size compared to the packing to pass through it. We have found that with conventional graphite packings a pore size of less than about 2 mm. diameter is suitable.

The holding-down plate may conveniently consist of a resilient bed of filamentary material, for example of metal wires, and suitable holding down plates in accordance with the invention are woven or knitted meshes made of a metal wire resistant to the corrosive conditions existing in the denuder, for example stainless steel wire. Alternatively the filamentary material may be a synthetic fibre which must be able to withstand the temperature and conditions existing in the denuder. The holding-down plate is preferably from about 1 to 3 inches in depth. A strip of mesh may conveniently be rolled up into a tight flat spiral forming a substantially circular "plate." We have found that suitable plates are formed by knitted stainless steel mesh filters which are commonly used in distillation columns to remove fine particles of liquid from a stream of vapour. The preferred form of strip is manufactured as a knitted tube of about 4 inches circumference, which is then flattened to form a double-layer strip of about 2 inches width and is preferably impressed with corrugations substantially across the width of the strip, for example with corrugations of a herringbone pattern, so as to increase its resistance to edgewise pressure. A very suitable material available commercially as "Knitmesh" in knitted stainless steel has approximately eight stitches per inch of length.

Plates according to the invention may be fitted in position simply by placing the plate in position on top of the graphite packing, placing one or more rigid cross members, grids, or other holding means on top of the plate, pressing the plate downwards to ensure that it is in close contact with the graphic packing and then fixing the holding means to hold the plate in position.

The graphite packing may be any of those conveniently used in vertical denuders for example lumps, cubes or spheres of graphite.

The alkali metal amalgam is preferably fed onto the top of the resilient holding-down plate as percolation of the amalgam through the plate can help to distribute the amalgam evenly through the bed of graphite.

The invention is illustrated but not limited by reference to the attached drawings in which like numerals denote like parts.

Figure 1:
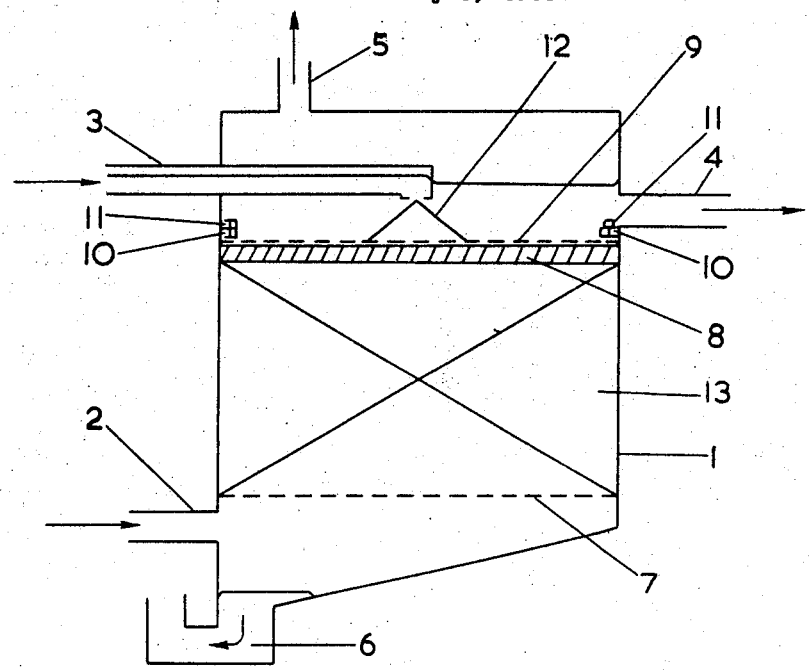
FIG. 1 represents a vertical cross section through a denuder.
Figure 2:
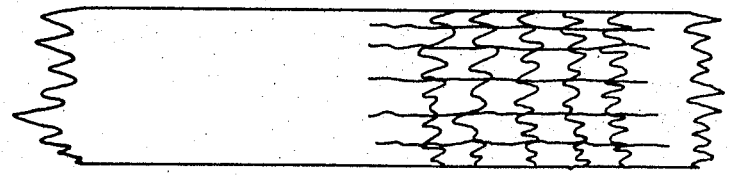
FIG. 2 represents a plan view of a strip of knitted mesh.
Figure 3:
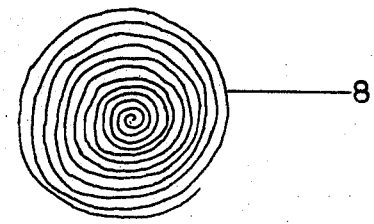
FIG. 3 represents a plan view of a strip of knitted mesh coiled in a spiral to form a substantially circular plate.

A container 1 made of mild steel is provided with an inlet 2 for water, an inlet 3 for alkali metal amalgam, an outlet 4 for alkali metal hydroxide solution, an outlet 5 for hydrogen and an outlet 6 for mercury. A bed of graphite particles 13 is supported on a mild steel grid 7 and is held in place by a plate 8 of 2 inches depth formed by a coiled spiral of knitted stainless steel wire, known in commerce as "Knitmesh." The coiled spiral of wire 8 is compressed and held in place by a mild steel perforated plate 9 which in turn is held in place by bolts 11 which co-operate with a flange or lugs 10 fitted to the inside of container 1. Attached to the grid 9 is a conical amalgam spreader 12.

In operation, water or dilute alkali metal hydroxide solution and alkali metal amalgam are fed into the denuder through inlets 2 and 3 respectively, the alkali metal amalgam being spread over the top of the graphite bed by means of the conical spreader 12 and being agitated in the graphite bed by evolution of hydrogen. Hydrogen leaves the vessel by outlet 5, which may be provided with a reflux condenser (not shown) to remove water vapour. Strong alkali metal hydroxide solution leaves by outlet 4 and denuded mercury by outlet 6.

We have found that a denuder substantially as described with reference to the drawings has operated satisfactorily for a period in excess of 10 months. At the end of this period the "Knitmesh" pad was in good mechanical condition and had held the graphite packing in a satisfactory state of compression as evidenced by the condition of the graphite packing and by the satisfactory quality of the caustic soda solution produced by the denuder.

What is claimed is:
1. A vertical denuder for decomposing alkali metal amalgam with water which comprises a container, a bed of alkali metal decomposition material in the form of graphite pieces within said container, a first inlet for pass- ing water up through the bed of graphite pieces, a second inlet for passing alkali metal amalgam over the bed of graphite whereby it can be reacted with said water, outlets for hydrogen and for alkali metal hydroxide above the bed of graphite pieces, an outlet for mercury below the bed of graphite pieces, a holding-down plate in the form of a resilient bed of material having a depth of at least one inch on top of said bed of graphite pieces and rigid means for pressing said plate downwardly toward said decomposition material, said rigid means having holding means for fixing the rigid means in said denuder whereby said plate holds said graphite pieces in position and applies pressure to them.

2. A vertical denuder as claimed in claim 1 wherein the holding-down plate has a pore size of less than about 2 mm. diameter.

3. A vertical denuder as claimed in claim 1 wherein the holding-down plate is made of stainless steel wire.

4. A vertical denuder as claimed in claim 1 wherein the holding-down plate is made of a synthetic fibre.

5. A vertical denuder as claimed in claim 1 wherein the plate is from about 1 to 3 inches in depth.

6. A vertical denuder as claimed in claim 1 wherein the holding-down plate has an open cross-sectional area which is greater than 90% of the total cross-sectional area.

7. A vertical denuder as claimed in claim 1 wherein the holding-down plate comprises a resilient bed of filamentary material.

8. A vertical denuder as claimed in claim 7 wherein the filamentary material comprises metal wires.

9. A vertical denuder as claimed in claim 8 wherein the holding-down plate comprises a woven or knitted mesh.

10. A vertical denuder as claimed in claim 1 wherein the holding-down plate comprises a strip of mesh rolled up into a tight flat spiral.

11. A vertical denuder as claimed in claim 10 wherein the strip is impressed with corrugations substantially across its width.

12. A vertical denuder as claimed in claim 11 wherein the corrugations are of a herringbone pattern.

References Cited

UNITED STATES PATENTS

| | | | |
|---|---|---|---|
| 1,886,671 | 11/1932 | Gottschalk et al. | 55—520X |
| 2,043,298 | 6/1936 | Markels | 55—519X |
| 2,382,560 | 8/1945 | Goodloe | 55—526X |
| 2,558,185 | 6/1951 | Leisen | 55—520 |
| 2,621,112 | 12/1952 | Schmalenbach | 55—512X |
| 2,749,221 | 6/1956 | Gilmont et al. | 55—519X |
| 2,881,116 | 4/1959 | Siegfried | 55—525X |
| 2,938,773 | 5/1960 | Kooistra | 23—283 |
| 3,165,387 | 1/1965 | Place | 55—526X |
| 3,398,837 | 8/1968 | Adams | 55—520X |
| 3,407,045 | 10/1968 | Temple | 23—283 |
| 2,083,648 | 6/1937 | Gorke | 23—184 |
| 3,019,082 | 1/1962 | Wygasch et al. | 23—282X |
| 3,104,949 | 9/1963 | Glover | 23—184 |
| 3,215,614 | 11/1965 | Gardiner | 23—184X |
| 3,502,434 | 3/1970 | MacMillan | 23—184 |

FOREIGN PATENTS

| | | | |
|---|---|---|---|
| 809,336 | 2/1959 | Great Britain | 23—283 |

MORRIS O. WOLK, Primary Examiner

B. S. RICHMAN, Assistant Examiner

U.S. Cl. X.R.

23—184, 211, 252, 282, 285; 55—233, 387, 516, 520, 525